United States Patent
Sanchez Charles et al.

(10) Patent No.: US 11,153,196 B2
(45) Date of Patent: Oct. 19, 2021

(54) EFFICIENT MACHINE LEARNING FOR NETWORK OPTIMIZATION

(71) Applicant: CA, Inc., New York, NY (US)

(72) Inventors: David Sanchez Charles, Barcelona (ES); Giorgio Stampa, Barcelona (ES); Victor Muntés-Mulero, Sant Feliu de Llobregat (ES); Marta Arias, Barcelona (ES)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 16/854,738

(22) Filed: Apr. 21, 2020

(65) Prior Publication Data
US 2020/0252324 A1   Aug. 6, 2020

Related U.S. Application Data

(63) Continuation of application No. 16/170,218, filed on Oct. 25, 2018, now Pat. No. 10,666,547.

(51) Int. Cl.
*H04L 12/751* (2013.01)
*H04L 12/755* (2013.01)
(Continued)

(52) U.S. Cl.
CPC .............. *H04L 45/08* (2013.01); *H04L 41/16* (2013.01); *H04L 45/021* (2013.01); *H04L 45/124* (2013.01); *H04L 45/14* (2013.01); *H04L 45/22* (2013.01); *H04L 45/64* (2013.01)

(58) Field of Classification Search
CPC ....... H04L 41/16; H04L 45/021; H04L 45/08; H04L 45/12; H04L 45/124; H04L 45/14; H04L 45/22; H04L 45/64
See application file for complete search history.

(56) References Cited

U.S. PATENT DOCUMENTS 6,067,572 A   5/2000 Jensen et al.
6,584,071 B1  6/2003 Kodialam et al.
(Continued)

FOREIGN PATENT DOCUMENTS

CN   106953802       7/2017
EP   1 378 841 A1   1/2004
(Continued)

OTHER PUBLICATIONS

Bai, et al., "A Survey on Artificial Intelligence for Network Routing Problems", [online] retrieved on Jun. 20, 2018 from <https://pdfs.semanticscholar.org/c5b9/e102c4c058a84f5078d786f857b0df5123af.pdf>, 2007, 10 pages.
(Continued)

*Primary Examiner* — Thomas R Cairns
(74) *Attorney, Agent, or Firm* — Foley & Lardner LLP

(57) ABSTRACT

An autonomous controller for SDN, virtual, and/or physical networks can be used to optimize a network automatically and determine new optimizations as a network scales. The controller trains models that can determine in real-time the optimal path for the flow of data from node A to B in an arbitrary network. The controller processes a network topology to determine relative importance of nodes in the network. The controller reduces a search space for a machine learning model by selecting pivotal nodes based on the determined relative importance. When a demand to transfer traffic between two hosts is detected, the controller utilizes an AI model to determine one or more of the pivotal nodes to be used in routing the traffic between the two hosts. The controller determines a path between the two hosts which comprises the selected pivotal nodes and deploys a routing configuration for the path to the network.

17 Claims, 4 Drawing Sheets

(51) Int. Cl.
*H04L 12/721* (2013.01)
*H04L 12/24* (2006.01)
*H04L 12/707* (2013.01)
*H04L 12/715* (2013.01)

(56) References Cited

U.S. PATENT DOCUMENTS

| | | |
|---|---|---|
| 7,391,742 B2 | 6/2008 | Zabele et al. |
| 7,957,266 B2 | 6/2011 | Kodialam et al. |
| 8,730,817 B2 | 5/2014 | Resende et al. |
| 10,389,585 B2 | 8/2019 | Mizrachi |
| 10,531,314 B2 * | 1/2020 | Abou-Rizk ............ H04L 43/50 |
| 2012/0140636 A1 | 6/2012 | Resende et al. |
| 2013/0197955 A1 | 8/2013 | Dillon |

FOREIGN PATENT DOCUMENTS

| | | |
|---|---|---|
| KR | 2017051153 A | 5/2017 |
| WO | WO-02/03716 A1 | 1/2002 |

OTHER PUBLICATIONS

Cisco, "Traffic Demand Modeling", [online] retrieved on Oct. 22, 2018 from <https://www.cisco.com/c/en/us/td/docs/net_mgmt/wae/6-3-1/design/user/guide/WAE_Design_User_Guide/wd_demands.pdf>, Mar. 8, 2016, 26 pages.

Lee, et al., "Efficient Routing Scheme Using Pivot Node in Wireless Sensor Networks", In: Shi Y., van Albada G.D., Dongarra J., Sloot P.M.A. (eds) Computational Science—ICCS 2007. ICCS 2007. Lecture Notes in Computer Science, vol. 4490. Springer, Berlin, Heidelberg, 4 pages.

Mestres, et al., "Knowledge-Defined Networking", [online] retrieved on Jun. 20, 2018 from <https://arxiv.org/pdf/1606.06222.pdf>, Jun. 23, 2016, 8 pages.

Stampa, et al., "A Deep-Reinforcement Learning Approach for Software-Defined Networking Routing Optimization", [online] retrieved on Sep. 26, 2018 from <https://arxiv.org/pdf/1709.07080.pdf>, Sep. 20, 2017, 3 pages.

U.S. Notice of Allowance on U.S. Appl. No. 16/170,218 dated Jan. 23, 2020 (17 pages).

* cited by examiner

EFFICIENT MACHINE LEARNING FOR NETWORK OPTIMIZATION

RELATED APPLICATIONS

The present application claims the benefit of and priority as a continuation to U.S. patent application Ser. No. 16/170,218, entitled "Efficient Machine Learning for Network Optimization," filed Oct. 25, 2018, the entirety of which is incorporated by reference herein.

BACKGROUND

The disclosure generally relates to the field of data processing, and more particularly to network routing optimization.

A network is an interconnected set of devices that can include multiple hosts and network devices such as routers and switches. As traffic propagates through a network, there are multiple paths which the traffic can use to travel from a source to a destination. Routing paths are often defined in a routing table or routing information base (RIB). A routing table is a data table stored in a router or a networked computer that lists the routes to particular network destinations, and in some cases, metrics (distances) associated with those routes. Routing tables can be manually defined or constructed using routing protocols.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to determining routing configurations for a Software-Defined Network (SDN) in illustrative examples. Aspects of this disclosure can be also applied to determining routing configurations for physical routing or switching devices. In other instances, well-known instruction instances, protocols, structures and techniques have not been shown in detail in order not to obfuscate the description.

Overview

SDN systems provide for centralized monitoring and control of a fully programmable network. However, centralized network control via manual configuration by an operator is affected by long reaction time and can suffer from fragility and poor scalability. Instead, an autonomous artificial intelligence (AI) controller for SDN, virtual, and/or physical networks can be used to optimize a network automatically and determine new optimizations as a network scales. The controller trains models that can determine in real-time the optimal path for the flow of data from node A to B in an arbitrary network. The controller processes a network topology to determine relative importance of nodes and links in the network. The controller reduces a search space for a machine learning model by selecting pivotal nodes based on the determined relative importance. When a demand to transfer traffic between two hosts is detected, the controller utilizes an AI model to determine one or more of the pivotal nodes to be used in routing the traffic between the two hosts. After selecting one or more pivotal nodes, the controller determines a path between the two hosts which comprises the selected pivotal nodes and deploys a routing configuration for the path to the network. The controller monitors the network to continue refining the pivotal node choices and the AI model of the network so that performance of the network can be maintained or improved. Using these techniques, the controller can provide network optimization for arbitrary network conditions without relying on heuristics that are rigid and hard to design/test and can adapt automatically to a changing state of the network. Additionally, the use of pivotal nodes lightens the learning burden of the autonomous AI controller and renders understandable the controller's selected routing configurations.

Example Illustrations

Figure 1:
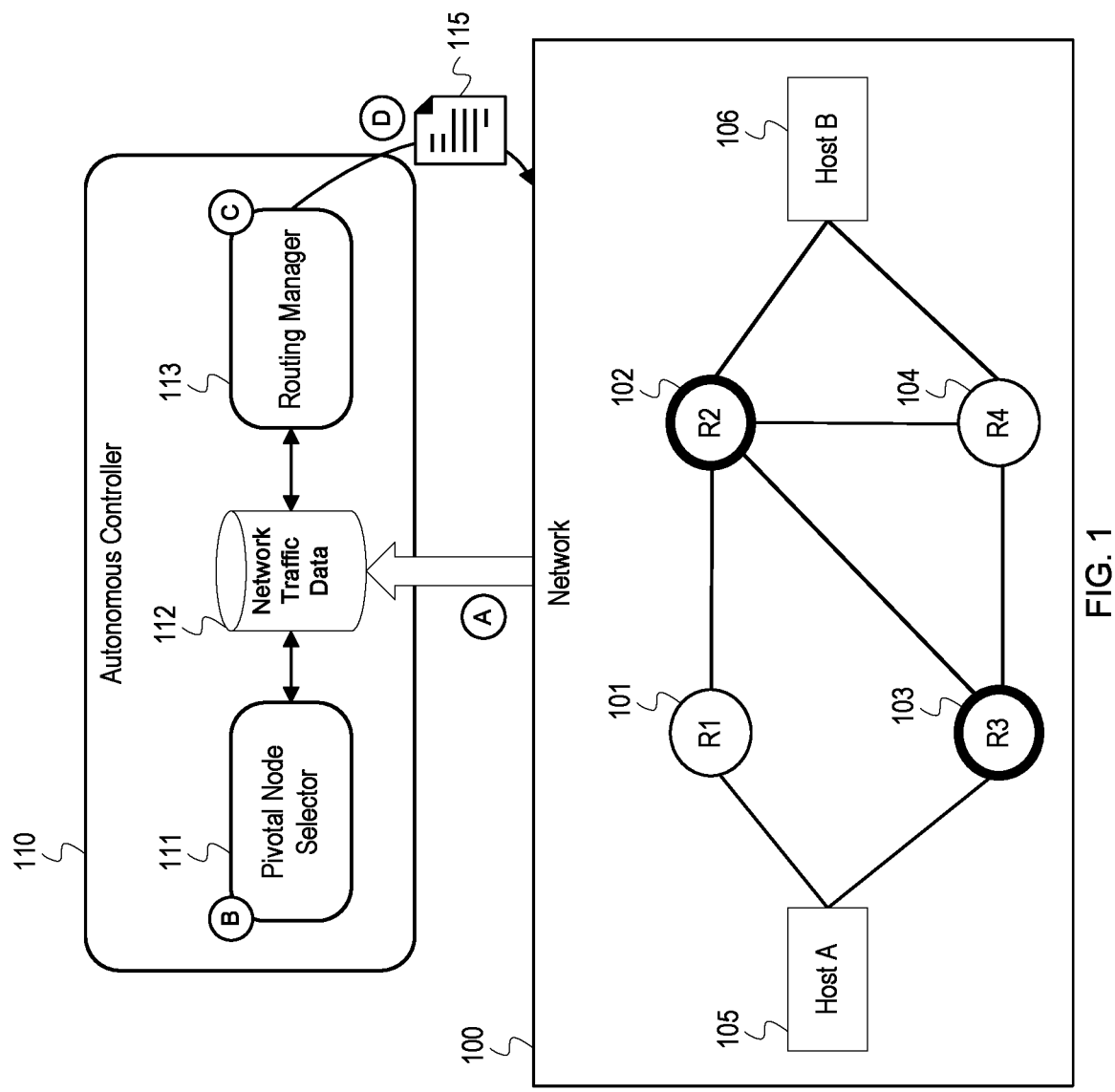
FIG. 1 depicts an example system for autonomously configuring optimal routing paths in a network.

FIG. 1 depicts an example system for autonomously configuring optimal routing paths in a network. FIG. 1 depicts a network 100 which includes a router 1 101, a router 2 102, a router 3 103, a router 4 104 (collectively referred to as "the routers"), a host A 105, and a host B 106. FIG. 1 also depicts an autonomous controller 110 ("controller 110") which includes a pivotal node selector 111 and a routing manager 113. The pivotal node selector 111 and the routing manager 113 are communicatively coupled to a network traffic data 112 database which stores telemetry and analytics information for the network 100.

FIG. 1 depicts a simplified network with minimal components in order to avoid obfuscating the description. The network 100 can include additional components, e.g. routers and switches, which are not depicted. The routers in the network 100 may be SDN or network function virtualization (NFV) components which are controlled by an SDN controller or manager or a mix of SDN and physical routers. A topology or other representation of the network 100 is stored in the network traffic data 112 for access by the pivotal node selector 111 and routing manager 113. The topology may be supplied by an SDN controller or may be generated through other techniques such as polling using the simple network management protocol (SNMP).

At stage A, the controller 110 receives telemetry data from the network 100 which is stored in the network traffic data 112. The controller 110 may be considered to be part of a knowledge or management plane of a network, and the network 100 part of a data plane. The data plane includes components responsible for typical network activities such as storing, forwarding, and processing data packets. The knowledge and management planes take advantage of an overhead view of the network 100 to ensure correct operation and performance and to control operation of the network 100 in response to identified network behaviors and issues. The network 100 can receive a variety of information including: (1) packet-level and flow-level data which can include deep packet inspection information, flow granularity data and relevant traffic features; (2) network state data which can include physical, topological and logical configuration of the network; (3) control and management state data which can include information included both in the SDN controller and management infrastructure, including policy, virtual topologies, application-related information, etc.; (4) service-level telemetry which can include monitored service-level information (e.g., load of the services, quality of experience, etc.) that is relevant to learn the behavior of the application or service, and its relation with the network performance, load and configuration; and (5) external information which can include information about future events which may have a strong impact on the network (e.g., a number of people attending a conference or sporting event). The information is stored in the network traffic data 112 and utilized by the pivotal node selector 111 to select pivotal node(s) and the routing manager 113 to determine optimal routing configurations as described below.

At stage B, the pivotal node selector 111 selects the router 2 102 and the router 3 103 as pivotal nodes for the network 100. When traffic is sent through a network, a choice is made on which path is used to transmit the traffic. A path is a sequence of links from a source to a destination, links being the physical connections between routers or other network nodes represented by the lines between nodes in the network 100. In the network 100, for example, there are seven possible acyclic path choices for the source-destination pair of the host A 105 and the host B 106: (1) A-R1-R2-B, (2) A-R1-R2-R3-R4-B, (3) A-R1-R2-R4-B, (4) A-R3-R2-B, (5) A-R3-R4-B, (6) A-R3-R2-R4-B, and (7) A-R3-R4-R2-B. In some instances, non-acyclic path choices may be considered resulting in even more potential paths. While there is a manageable number of possible paths in the network 100, the number of possible paths in real computer networks can quickly grow to a number for which it is impractical to choose among them. For example, in a network of n nodes, the number of possible paths connecting two given nodes is on the order of $O(n!)$, which becomes intractable as n grows. Additionally, other information beyond possible paths, such as an amount of traffic in a network and other telemetry noted above, further complicates the problem of path selection. To reduce the complexity of determining a path in a network, one or more pivotal nodes are chosen, and the possible paths are limited to only those paths which include the pivotal nodes. As indicated by the bold outline on the router 2 102 and the router 3 103 in FIG. 1, the router 2 102 and the router 3 103 are selected by the pivotal node selector 111 to serve as a pivotal node for the network 100.

To select pivotal nodes, the pivotal node selector 111 generates a ranking of nodes in the network 100. As described in more detail in FIG. 2, the pivotal node selector 111 first simplifies the topology for the network 100 to identify nodes which are used to route network traffic and are not terminal nodes or endpoints. The pivotal node selector 111 then sorts the remaining nodes per relative importance. Importance of a node can be based on a degree of the node (i.e., a number of connected edges), a closeness centrality of the node, a betweenness centrality of the node, an amount of traffic already routed through the node, etc. The closeness centrality (or closeness) of a node refers to the average length of the shortest path between the node and all other nodes in the graph. Each of these factors may be assigned a weight, or the pivotal node selector 111 may be configured to consider a single factor and use other factors as a tie breaker between nodes. Other factors including current or historical network conditions can affect the overall ranking for a node. For example, a node may be penalized for generating (or attracting) more traffic than other nodes over a recent time period. After determining the ranking, the pivotal node selector 111 selects a number of the highest ranked pivotal nodes. The number of pivotal nodes selected can vary based on a size of a network, i.e., a total number of nodes in the network. For example, the greater the number of nodes in a network the greater the number of pivotal nodes selected, e.g., one pivotal node may be selected for every 10 nodes in a network.

At stage C, the routing manager 113 chooses one or both of the pivotal nodes of the router 2 102 and the router 3 103 to be utilized in routing a traffic demand for the host A 105 in the network 100. When a demand or request to transfer traffic by a host is detected, the routing manager 113 determines and deploys a path for routing the traffic to satisfy the demand. Although the routing manager 113 could analyze and choose from each possible path, the routing manager 113 instead simplifies the problem by analyzing the selected pivotal nodes and determining one or more of the pivotal nodes which, when utilized, should result in the optimal routing performance for the traffic. In FIG. 1, for example, instead of choosing from the seven possible paths identified above, the routing manager 113 determines a routing configuration by selecting from among the pivotal nodes of the router 2 102 and the router 3 103. The routing manager 113 can select one of the pivotal nodes or select both pivotal nodes as an ordered pair, e.g., (router 3 103, router 2 102) or (router 2 102, router 3 103). Once the selection is made, the routing manager 113 selects and deploys a shortest path, i.e., the path with the minimum number of nodes, between the host A 105 and the host B 106 that includes the selected pivotal nodes. For example, if only the router 2 102 is chosen, the routing manager 113 selects the shortest path that goes through the router 2 102, e.g., the path A-R1-R2-B. If the router 3 103 and the router 2 102 are chosen as an ordered pair, the routing manager 113 determines the shortest path from the host A 105 to the router 3 103, the shortest path from the router 3 103 to the router 2 102, and then the shortest path from the router 2 102 to the host B 106. When there is a tie for the shortest path, the routing manager 113 can randomly select one of the shortest paths or utilize performance metrics of the paths, such as network traffic, to select from among the shortest paths. In some implementations, instead of selecting a shortest path, the routing manager 113 can assign weights to connections/edges or nodes in the network 100 and select the path with lowest sum of weights.

To determine which pivotal nodes to utilize for routing a traffic demand, the routing manager 113 can utilize an AI or machine learning model (e.g., a neural network) to determine the optimal pivotal node selections. The routing manager 113 can utilize various types of machine learning techniques, such as supervised learning, unsupervised learning, or reinforcement learning. For example, when performing reinforcement learning, the routing manager 113 aims to discover which actions or pivotal node selections lead to a quasi-optimal routing configuration. In reinforcement learning, the network 100 may be modeled as a stochastic finite state machine where the routing manager 113 sends inputs (actions) and receives outputs (observations and rewards). The routing manager 113 identifies actions (routing configurations) that maximize the rewards. The rewards may be based on a target policy set by a network administrator. For example, a maximum desired delay for a set of traffic flows may be specified. The routing manager 113 then changes and simulates pivotal node selections and for each selection receives a reward, which increases in value as the experienced delay gets closer to the target policy. Ultimately, the routing manager 113 learns the pivotal node selection that results or gets closest to the target policy. The learning phase can be performed offline, i.e., out of band from the operation of the network 100, or online, i.e., in real time with the operation of the network 100. During an offline learning phase, a machine learning model can be trained with datasets simulating or based on actual behavior of a large set of networks which may be filtered to include networks similar to the network 100. The online training phase uses data from the network 100 to train the machine learning models.

In one embodiment, the routing manager 113 creates and trains a neural network to determine weights for the available pivotal nodes. The routing manager 113 configures the neural network for accepting input such as identifiers for the hosts indicated in a traffic demand, an amount of traffic to be transmitted between the hosts, and current traffic for the network 100. For example, the routing manager 113 may input a source-destination pair of the host A 105 and the host B 106, input that the host A 105 plans to send 100 gigabytes of data to the host B 106, and input an amount of traffic currently being transmitted or recently transmitted between the two hosts. Current traffic data can include a traffic load at all nodes in the network 100, a traffic load at the pivotal nodes, or traffic being transmitted between hosts. For example, the routing manager 113 can generate a matrix where the rows and columns represent hosts and each entry in the matrix indicates the current traffic between the corresponding hosts. The neural network outputs a weight for each possible pivotal node selection, e.g., the router 2 102, the router 3 103, (router 3 103, router 2 102) and (router 2 102, router 3 103). The routing manager 113 then selects one of the pivotal node options based on the weights, e.g., the routing manager 113 selects the order pair of (router 2 102, router 3 103) if it has the highest weight.

In general, regardless of the learning technique or model utilized, the routing manager 113 arrives at optimal pivotal node selections through repeated, stepwise application of self-generated routing configurations to the network 100 or a model of the network 100. Through this process, the routing manager 113 learns the relationship between network conditions such as current network load, current traffic demand, and routing configuration for the traffic demand, and a scalar metric or "reward" which indicates the network's performance. The performance metric could be a function of the global network delay or load for the network 100. This relationship between network conditions and a performance metric can be expressed as follows:

$$\text{performance} = f(\text{load}, \text{traffic}, \text{routing}) \quad (1)$$

Ultimately, the routing manager 113 determines which router configurations/pivotal node selections optimize the above equation and should result in the best performance.

At stage D, the routing manager 113 deploys a routing table 115 to network 100. The routing manager 113 utilizes the optimal pivotal node selection and a shortest path determined at stage C to generate the routing table 115. The routing table 115 identifies a path to be utilized for transmitting the traffic between the host A 105 and the host B 106. For example, the routing table 115 may indicate that traffic received at the router 2 102 from the host B 106 should be transmitted to the router 1 101 and then from the router 1 101 to the host A 105. The routing manager 113 may reconfigure the routers or may send the routing table 115 to an SDN controller in the network 100 which changes the configurations of the routers based on the identified paths. Alternatively, in some implementations, the routing table 115 may be sent to one or more of the routers and then shared and propagated through the network 100 by the routers.

The operations of stages C and D described above can be repeated as additional traffic demands are detected. Additionally, the operations of stage B may be periodically repeated and refined as the performance of the network 100 continues to be monitored or as nodes are added/removed from the network 100. In general, different pivotal nodes may be selected at stages B or C based on changes in network traffic loads. The change in pivotal node selections may lead to the determination of different optimal routing configurations to be deployed. Additionally, the network 100 may include more hosts than the host A 105 and the host B 106 depicted in FIG. 1, e.g., a host C and a host D. The routing manager 113 performs the operations of stage C to select a pivotal node for each pair of hosts. For example, the routing manager 113 may select the router 2 102 as a pivotal node for routing traffic between the host A 105 and the host B 106 and may select the combination of the router 3 103 and the router 2 102 as pivotal nodes for routing traffic between the host A 105 and a host C.

Figure 2:
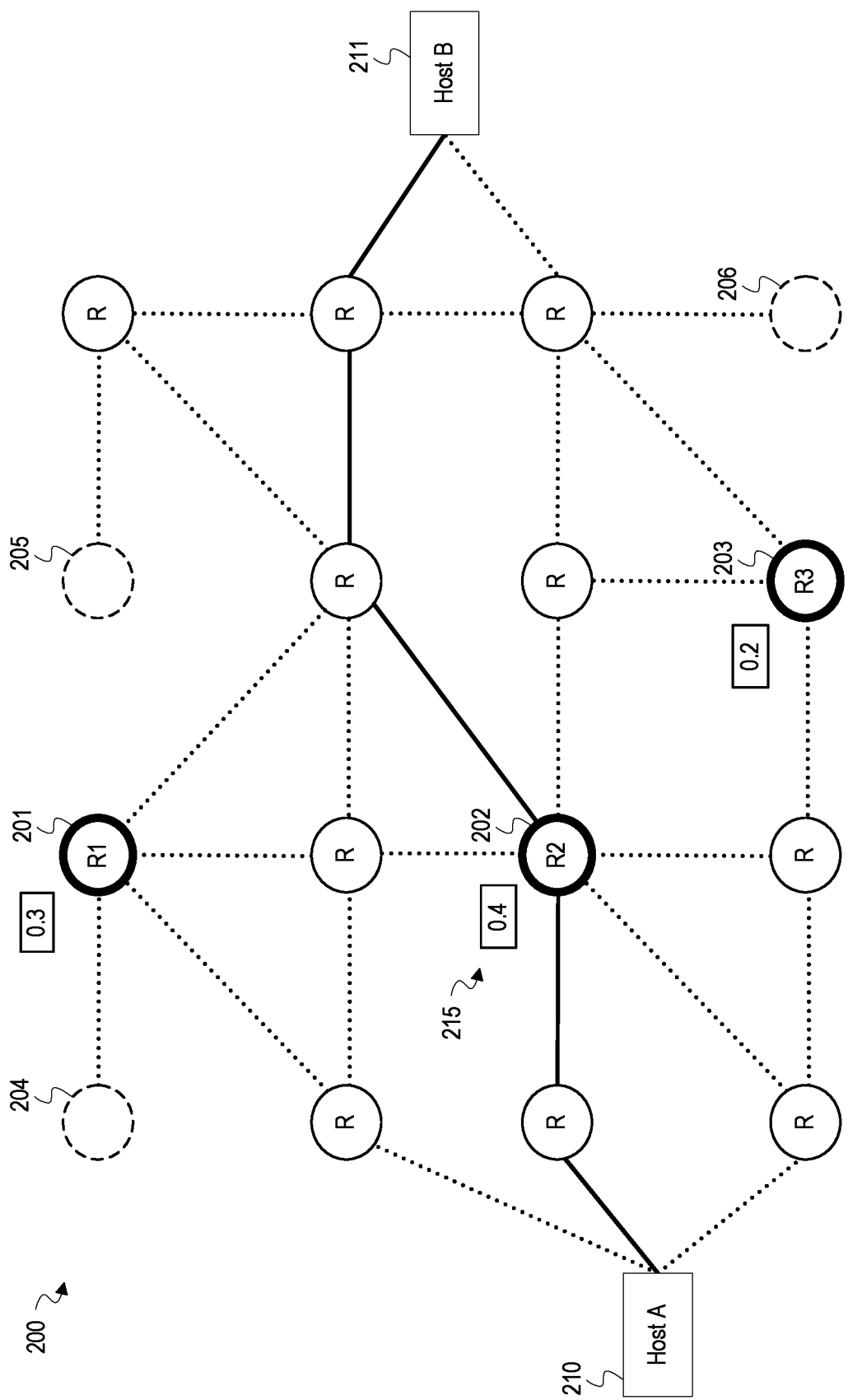
FIG. 2 depicts an example simplified network topology with a selected routing path.

FIG. 2 depicts an example simplified network topology with a selected routing path. FIG. 2 depicts a network topology 200 which indicates connections between nodes of a network including routers and hosts. In particular, the topology 200 includes routers 201, 202, and 203; a host A 210; and a host B 211. The topology 200 also includes terminal nodes or endpoints 204, 205, and 206. The topology 200 includes nodes labeled with an "R" for router, although these nodes may be other network devices such as switches, proxy or gateway devices, etc.

The topology 200 may be generated stored as a graph data structure or other data structure capable of being interpreted by an autonomous controller for identifying devices and connections therebetween. The topology 200 can be processed by the autonomous controller to simplify the topology 200 for purposes of identifying pivotal nodes and optimal routing paths. For example, in FIG. 2 as indicated by the dashed lines, the nodes for the endpoints 204, 205, and 206 have been eliminated from the topology 200. Since the endpoints cannot be used for routing traffic, they are unsuitable for selection as pivotal nodes or for use in routing paths. These nodes are removed from the topology 200 or otherwise eliminated for consideration by an autonomous controller.

As indicated by the bold outlines, the routers 201, 202, and 203 have been selected as pivotal nodes. As described above, various factors can be considered when ranking and selecting pivotal nodes, such as a degree of the nodes, centrality, historical or projected traffic metrics, etc. For example, the router 2 202 may have been selected based on having a degree of 6, which is the highest degree in the topology 200. The router 3 203 may have been selected based on a closeness centrality to the host A 210 and the host B 211 and having a history of low network traffic. The number of nodes selected as pivotal nodes engenders a tradeoff between training/learning costs of the AI models of the autonomous controller and performance of the network. Fewer pivotal nodes limits a total number of options for routing a traffic demand and, therefore, reduces training costs but can lead to performance issues since network traffic is being routed through a fewer number of nodes. Conversely, a greater number of pivotal nodes (potentially all the nodes in the network) creates a greater number of options thereby increasing training costs but reducing the chance of artificial traffic chokepoints in the network.

FIG. 2 also depicts example weights 215 for the pivotal nodes including the router 1 201, the router 2 202, and the router 3 203. The weights 215 are one technique that may be utilized by an autonomous controller for selecting which pivotal nodes to use for routing traffic between two hosts. For example, the autonomous controller may select a pivotal node with a lowest total weight or cost (or a highest total weight depending on how the weights are determined). The weights 215 may be calculated based on a ratio of available bandwidth or potential throughput and an amount of traffic currently/historically being transmitted by the pivotal node. Alternatively, the weights 215 may represent "rewards" determined by an AI model, the weights 215 representing the proximity to a target policy or optimization of a function, such as the one indicated in equation (1) above. Although FIG. 2 depicts the weights 215 as being assigned to pivotal nodes, weights can also be assigned to other nodes, connections/edges between the nodes, or a single weight for each possible path between the two hosts.

Figure 3:
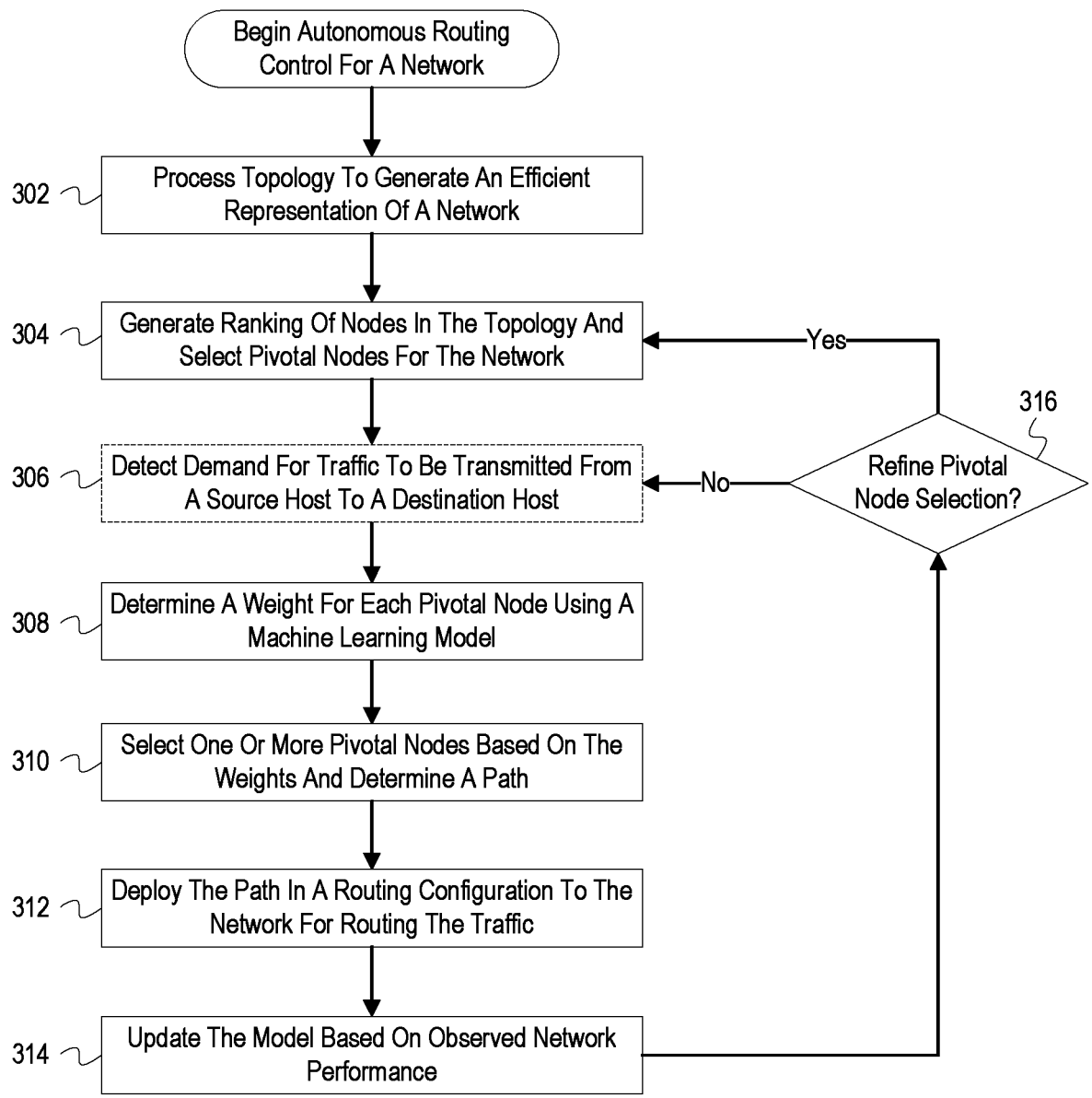
FIG. 3 depicts a flowchart with example operations for performing autonomous routing control for a network.

FIG. 3 depicts a flowchart with example operations for performing autonomous routing control for a network. FIG. 3 describes a controller as performing the operations for naming consistency with FIG. 1, although naming of program code can vary among implementations.

An AI-based network controller ("controller") processes a topology to generate a reduced representation of a network (302). The topology can be represented by a directed graph. From analysis of the topology, the controller generates a simpler but non-lossy representation of the network. The controller processing eliminates terminal nodes which cannot be part of any path between any given source-destination pair of nodes. The controller can also eliminate nodes which cannot be selected as pivotal nodes, such as nodes which may be reserved for communications between a specified source-destination pair. Eliminating nodes allows for more efficient identification of which nodes can be selected as pivotal nodes and, due to the fewer number of nodes, faster calculation of node attributes, such as centrality.

The controller generates rankings of the nodes in the topology and selects pivotal nodes (304). The controller sorts the nodes in the topology per relative importance given by, e.g., their degree of betweenness centrality, closeness centrality, connectivity, performance metrics, etc. The controller then selects a number of the highest ranked nodes to be pivotal nodes. The number of pivotal nodes can be configured by an administrator, or the controller can adaptively change the number of pivotal nodes based on measure network performance. For example, if a network performance metric, such as delay or lag, falls below a threshold, the controller can increase the number of pivotal nodes selected. Increasing the number of pivotal nodes selected can increase the complexity of models used for pivotal node selection at block 308. As a result, the upper bound for a number of pivotal nodes may be based on an amount of resources available for training and executing a machine learning model.

The controller detects demand for traffic to be transmitted from a source host to a destination host (306). As indicated by the dashed line for the operation 306, this operation may be a continuously running background operation which monitors communications in the network to detect requests or indications that a host plans to send data through the network in a subsequent transmission. For example, a host may broadcast or otherwise indicate that it is going to transmit a large amount of data to another host, such as storage system transmitting a large backup file. As an additional example, a host may send a packet to perform a handshake or initiate a session with another host. The controller can detect the packet and interpret the packet as an intent of the source host to transfer traffic to a destination host. The controller may also detect a service class of the traffic to be transmitted, such as video or voice. The amount of traffic to be transmitted as indicated in the traffic demand may be in addition to traffic currently being transmitted between two hosts. The controller performs the operations below for determining a path for the traffic in response to detection of the traffic demand. The operations below can be performed in near real-time in order to quickly adapt to the changing network characteristics (e.g., load or traffic).

The controller determines a weight for each of the pivotal nodes using a machine learning model (308). The operations for determining weights can vary depending on a type of machine learning model used, e.g., a neural network or a reinforcement learning agent, and the structure/configuration of the model, e.g., a number of input and output nodes, a number of hidden layers in the neural network, target policies, etc. Also, training of the model can vary based on an available training data set. The controller can use performance and traffic data from the real network to generate training data sets or simulate network performance in the model. The model is also trained with some initial assumptions, such as the selected set of pivotal nodes and a number of pivotal nodes to be included in a path. The model can be configured to select a single pivotal node; select a first pivotal node to be traversed and then a second, and so on; or select combinations of different numbers of pivotal nodes (although this can greatly increase the complexity of the model). In general, the controller trains the model (e.g., a reinforcement learning agent) via its interaction with a real (or simulated) network and through repeated stepwise application of self-generated configurations (i.e., routing configurations) to the real or simulated network. The resulting machine learning model reflects the structure of the network based on the processed topology and reflects the network's behaviors based on the observed performance information. The controller provides as inputs to the model the source-destination hosts indicated in the detected traffic demand, a current amount of traffic between the source-destination hosts, and an amount of traffic to be transmitted as indicated in the traffic demand. In some implementations, these inputs may be replaced or supplemented by other information such as an expected duration for a session or traffic transmission, a service class for the traffic (e.g., voice or video), additional performance metrics (e.g., current network latency), etc. The model output weights or scores for each of the pivotal nodes selected at block 304 or combinations thereof. In general, the weights may be based on a performance metric determined as a relationship between the current network load, current traffic demand, and routing configuration for the traffic demand (as shown in equation (1) above).

The controller selects one or more pivotal nodes based on the weights and determines a path comprising the selected pivotal nodes (310). The controller selects the pivotal node or pivotal node combination which the model indicated as the optimal choice, e.g., the pivotal node with the greatest weight. The controller then determines a path between source and destination hosts which passes through the selected pivotal node(s). If a single pivotal node is selected, the controller determines a path from the source host to the pivotal node and a path from the pivotal node to the destination host. If a combination of pivotal nodes are selected, the controller determines a path between the source host and a first pivotal node, a path between each pair of pivotal nodes, and a path between a last pivotal node and the destination host. The determined paths are combined to generate a complete path for routing traffic from the source host to the destination host. The paths may be selected so that there is a minimum number of nodes in each path or may be selected based on current network traffic load with the goal of evenly distributing network traffic throughout the network.

The controller deploys the determined path in a routing configuration to the network for routing the traffic (312). The controller converts the determined path into a routing table which defines the network traffic path to be traversed between the source and the destination hosts. The routing table can be deployed to routers in the network or to an SDN controller which manages configuration of the routers. In some implementations, the controller may perform post-processing on the path prior to deployment to ensure that the path is acyclic. The complete path determined at block 310 can be analyzed to identify and eliminate cycles.

The controller updates the model based on observed network performance (314). The controller monitors the network to compare actual network performance to the model. The controller determines whether the actual network performance matches the simulated performance determined by the model. For example, the controller determines whether the global network delay or load of the real network matches the global network delay or load experienced during simulations or as estimated by the model. Performance and traffic data from the network are fed back into the model to improve simulations of the network and continue improving the machine learning model for future routing determinations for network traffic.

The controller determines whether the selection of pivotal nodes for the network should be refined (316). If the performance of the network with the optimal routing configuration is not meeting expectations, the controller can re-perform the operations of block 304 and determine a different set of pivotal nodes, increasing the number of pivotal nodes, or use different measures of relative importance for the nodes. If the set of pivotal nodes change, the controller retrains the model used at block 308. The controller then generates weights and selects from the revised set of pivotal nodes at blocks 308 and 310 when determining an optimal routing configuration for the network. The controller may automatically refine the pivotal node selection if changes to the network are detected, such as nodes being added/removed, changes in network behavior/traffic patterns, etc. If the controller determines that the pivotal node selection should be refined, the controller performs the operations of block 304. After refining the pivotal node selection or after determining that the pivotal node selection should not be refined, the controller resumes monitoring for indications that traffic is to be transmitted within the network at block 306.

The operations described above can be performed for multiple traffic demands between various sources and destinations in a network in parallel or may be repeated for each traffic demand and source-destination pair in a network. Each source-destination pair and traffic demand can have different pivotal node selections for routing the traffic.

Variations

FIG. 1 is annotated with a series of letters A-D. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 310 and 312 of FIG. 3 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The description above focuses on determining a single path comprising one or more pivotal nodes to be used to route traffic between two hosts. In some instances, multiple paths can be indicated for a single source-destination pair and the network configured to equally split traffic from the hosts between the two paths. Additionally, the controller can utilize other parameters to optimize a network such as Quality of Service (QoS) settings including throttling or bandwidth reservations. For example, the controller can generate a routing configuration that indicates communications between two hosts should be throttled to 20 megabits per second.

The term "optimal" is used above to describe a routing configuration, pivotal node selection, or path selection which is likely to lead to the best performance given the current set of conditions for a network. As described above, pivotal nodes are selected for a network to simplify the problem of determining a path for routing traffic through a network. As a result, not all possible paths are considered; instead, the controller determines the optimal path based on the selected set of pivotal nodes. An "optimal routing configuration" determined above may not be the best performing configuration that is theoretically possible for a network but is the quasi-optimal configuration for a given set of pivotal nodes and available paths comprising those nodes.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semi-conductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
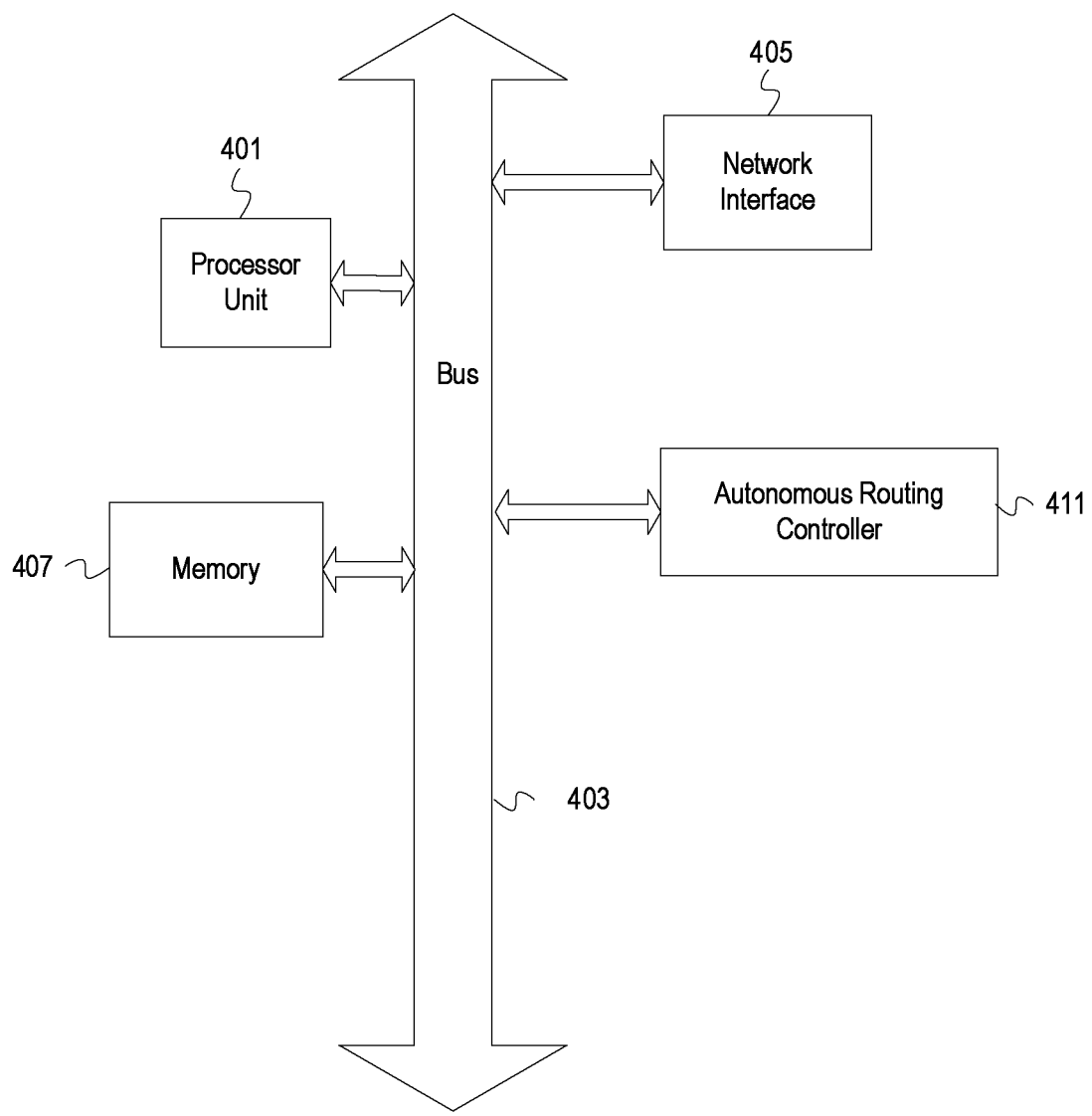
FIG. 4 depicts an example computer system with an autonomous routing controller.

FIG. 4 depicts an example computer system with an autonomous routing controller. The computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.). The system also includes an autonomous routing controller 411. The autonomous routing controller 411 generates an AI-based model for determining optimal routing configurations for a network. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for autonomously determining routing configurations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   processing a topology to generate a ranked list of nodes in a network, with each node ranked proportional to a centrality of the node in the topology, wherein the centrality is inversely proportional to an average length of at least (a) a first shortest path between the node and another node and (b) a second shortest path between the node and a second other node;
   selecting a set of pivotal nodes from highest ranked nodes of the ranked list of nodes;
   determining one or more pivotal nodes from the set of pivotal nodes to be utilized in transmitting network traffic from a first host to a second host;
   generating a routing path between the first host and the second host that comprises the determined one or more pivotal nodes by:
   identifying a first shortest path between the first host and a first pivotal node of the determined one or more pivotal nodes, wherein the shortest path between the first host and the first pivotal node is a path in the topology which comprises a minimum number of nodes, and
   identifying a second shortest path between the first pivotal node and the second host in the topology; and
   deploying the routing path to the network.

2. The method of claim 1 further comprising:
   based on determining that there are multiple paths between the first host and the first pivotal node which qualify as the shortest path, selecting a path from the multiple paths based on at least one of random selection and performance metrics associated with each of the multiple paths.

3. The method of claim 1, wherein determining the one or more pivotal nodes from the set of pivotal nodes to be utilized in transmitting the network traffic comprises:
provide, as an input to a machine learning model, identifiers for the first host and the second host, a current amount of network traffic between the first host and the second host, and an additional amount of network traffic to the transmitted between the first host and the second host;
receiving, as output from the machine learning model, a weight for each of the set of pivotal nodes and combinations of the pivotal nodes; and
selecting the one or more pivotal nodes based, at least in part, on the weights.

4. The method of claim 1, wherein the ranked list of nodes is further based, at least in part, on at least one of a degree of each node in the topology, and historical or projected traffic metrics for each node in the topology.

5. The method of claim 1, wherein determining the one or more pivotal nodes from the set of pivotal nodes to be utilized in transmitting the network traffic is performed in response to detecting within the network a traffic demand from the first host.

6. The method of claim 1, wherein processing the topology to generate the ranked list of nodes in the network comprises eliminating nodes from the topology which cannot be utilized for routing traffic.

7. The method of claim 1, wherein the nodes in the network are routing devices, wherein deploying the routing path to the network comprises defining the routing path in a routing table and transmitting the routing table to the routing devices.

8. A non-transitory, computer-readable medium having instructions stored thereon that are executable by a computing device to perform operations comprising:
generating a ranking of nodes in a topology for a network proportional to a centrality of each node in the topology, wherein the centrality is inversely proportional to an average length of at least (a) a first shortest path between the node and another node and (b) second shortest path between the node and a second other node;
selecting a set of pivotal nodes from highest ranked nodes of the topology;
generating and training a machine learning model based, at least in part, on the topology and information related to performance and behaviors of the network;
providing, as an input to the machine learning model, identifiers for a first host and a second host;
identifying one or more pivotal nodes from the set of pivotal nodes to be utilized in transmitting network traffic between the first host and the second host based, at least in part, on output from the machine learning model; and
generating a routing path between the first host and the second host that comprises the one or more pivotal nodes by:
identifying a shortest path between the first host and a first pivotal node of the one or more pivotal nodes, wherein the shortest path between the first host and the first pivotal node is a path in the topology which comprises a minimum number of nodes, and
identifying a shortest path between the first pivotal node and the second host in the topology.

9. The computer-readable medium of claim 8, wherein the ranking of nodes in the topology is further based, at least in part, on at least one of a degree of each node in the topology, and historical or projected traffic metrics for each node in the topology.

10. The computer-readable medium of claim 8, further comprising instructions executable by the computing device to perform operations comprising providing, as the input to the machine learning model, identifiers for the first host and the second host are performed in response to detecting within the network a traffic demand from the first host, wherein the input to the machine learning model further includes a current amount of traffic between the first host and the second host and an amount of traffic indicated in the traffic demand.

11. An apparatus comprising:
a processor; and
a computer-readable medium having instructions stored thereon that are executable by the processor to cause the apparatus to:
process a topology to generate a ranked list of nodes in a network, with each node ranked proportional to a centrality of the node in the topology, wherein the centrality is inversely proportional to an average length of at least (a) a first shortest path between the node and another node and (b) a second shortest path between the node and a second other node;
select a set of pivotal nodes from highest ranked nodes of the ranked list of nodes;
determine one or more pivotal nodes from the set of pivotal nodes to be utilized in transmitting network traffic from a first host to a second host;
generate a routing path between the first host and the second host that comprises the one or more pivotal nodes by:
identifying a first shortest path between the first host and a first pivotal node of the determined one or more pivotal nodes, wherein the shortest path between the first host and the first pivotal node is a path in the topology which comprises a minimum number of nodes, and
identifying a second shortest path between the first pivotal node and the second host in the topology; and
deploy the routing path to the network.

12. The apparatus of claim 11, wherein the computer-readable medium further comprises instructions to, based on a determination that there are multiple paths between the first host and the first pivotal node which qualify as the shortest path, select a path from the multiple paths based on at least one of random selection and performance metrics associated with each of the multiple paths.

13. The apparatus of claim 11, wherein the computer-readable medium further comprises instructions to:
provide, as an input to a machine learning model, identifiers for the first host and the second host, a current amount of network traffic between the first host and the second host, and an additional amount of network traffic to be transmitted between the first host and the second host;
receive, as output from the machine learning model, a weight for each of the set of pivotal nodes and combinations of the pivotal nodes; and
select the one or more pivotal nodes based, at least in part, on the weights.

14. The apparatus of claim 11, wherein the ranked list of nodes is further based, at least in part, on at least one of a degree of each node in the topology, and historical or projected traffic metrics for each node in the topology.

15. The apparatus of claim 11, wherein the instructions to determine the one or more pivotal nodes from the set of pivotal nodes to be utilized in transmitting the network traffic are performed in response to detecting, within the network a traffic demand from the first host.

16. The apparatus of claim 11, wherein the instructions to process the topology to generate the ranked list of nodes in the network comprises instructions to eliminate nodes from the topology which cannot be utilized for routing traffic.

17. The apparatus of claim 11, wherein the nodes in the network are routing devices, wherein the instructions to deploy the routing path to the network comprises instructions to define the routing path in a routing table and transmit the routing table to the routing devices.

* * * * *